(12) United States Patent
Kaiser

(10) Patent No.: US 10,780,800 B2
(45) Date of Patent: Sep. 22, 2020

(54) CHILD SAFETY SEAT WITH ANTI-ROTATION DEVICE

(71) Applicant: Britax Römer Kindersicherheit GmbH, Leipheim (DE)

(72) Inventor: Thomas Kaiser, Laupheim (DE)

(73) Assignee: BRITAX RÖMER KINDERSICHERHEIT GmbH, Leipheim (DE)

(*) Notice: Subject to any disclaimer, the term of this patent is extended or adjusted under 35 U.S.C. 154(b) by 0 days.

(21) Appl. No.: 16/243,536

(22) Filed: Jan. 9, 2019

(65) Prior Publication Data

US 2019/0217751 A1    Jul. 18, 2019

(30) Foreign Application Priority Data

Jan. 10, 2018  (EP) .................................... 18151046

(51) Int. Cl.
  *B60N 2/26*   (2006.01)
  *B60N 2/28*   (2006.01)
  *B60N 2/42*   (2006.01)

(52) U.S. Cl.
  CPC ......... *B60N 2/2809* (2013.01); *B60N 2/2803* (2013.01); *B60N 2/2821* (2013.01); *B60N 2/2824* (2013.01); *B60N 2/2827* (2013.01); *B60N 2/2845* (2013.01); *B60N 2/2854* (2013.01); *B60N 2/2863* (2013.01); *B60N 2/2884* (2013.01)

(58) Field of Classification Search
  CPC .. B60N 2/2809; B60N 2/2803; B60N 2/2821; B60N 2/2824; B60N 2/2827; B60N 2/2845; B60N 2/2854; B60N 2/2863; B60N 2/2884

USPC .................................. 297/216.11, 254, 256.16
See application file for complete search history.

(56) References Cited

U.S. PATENT DOCUMENTS 5,722,720 A * 3/1998 Lumley ................ B60N 2/2863
                                          297/216.11
6,267,442 B1 * 7/2001 Shiino .................. B60N 2/2809
                                          297/254 X (Continued)

FOREIGN PATENT DOCUMENTS

DE     3505009 A1     8/1986
EP     0326265 A2     2/1989

(Continued)

OTHER PUBLICATIONS

European Search Report from application No. 18151046.2 dated Jun. 27, 2018, all pages cited in its entirety.

*Primary Examiner* — Rodney B White
(74) *Attorney, Agent, or Firm* — Burr & Forman, LLP

(57) ABSTRACT

A seat base, for a child safety seat, adapted to be secured with a safety belt of a vehicle, includes a base member configured to be placed on a seat of the vehicle, and a positioning element rigidly attached to the base member. The positioning element extends vertically from the base member. The positioning element an engaging member adapted to engage with the safety belt. The engaging member is coupled to the positioning element above the upper surface of the base member at a distance, and the engaging member is kept by the positioning element at the distance from the base member. A child safety seat including such a seat base is also provided.

14 Claims, 6 Drawing Sheets

(56) References Cited

U.S. PATENT DOCUMENTS

| | | | | |
|---|---|---|---|---|
| 6,517,154 B2* | 2/2003 | Sawamoto | B60N 2/2809 | 297/216.11 X |
| 6,560,825 B2* | 5/2003 | Maciejczyk | B60R 22/30 | 24/170 |
| 6,672,664 B2* | 1/2004 | Yanaka | B60N 2/2806 | 297/256.16 X |
| 7,488,034 B2* | 2/2009 | Ohren | B60N 2/2821 | 297/216.11 X |
| 8,136,881 B2* | 3/2012 | Vertegaal | B60N 2/2824 | 297/253 |
| 8,419,129 B2* | 4/2013 | Inoue | B60N 2/2806 | 297/256.16 X |
| 8,459,739 B2* | 6/2013 | Tamanouchi | B60N 2/2806 | 297/256.16 X |
| 2002/0043836 A1* | 4/2002 | Maciejczyk | B60N 2/2869 | 297/250.1 |
| 2005/0280297 A1* | 12/2005 | Patterson | B60N 2/002 | 297/217.4 |
| 2006/0091709 A1* | 5/2006 | Emmert | B60N 2/2806 | 297/256.16 |
| 2006/0273640 A1* | 12/2006 | Kassai | B60N 2/2806 | 297/256.16 |
| 2007/0114774 A1* | 5/2007 | Lang | B60R 22/28 | 280/801.1 |
| 2008/0296944 A1* | 12/2008 | Nakagawa | B60N 2/2809 | 297/256.16 X |
| 2011/0074194 A1* | 3/2011 | Weber | B60N 2/2821 | 297/256.16 X |
| 2011/0254331 A1* | 10/2011 | Nagelski | B60N 2/2806 | 297/216.11 |
| 2012/0126597 A1* | 5/2012 | Hall | B60N 2/2809 | 297/250.1 |
| 2014/0070581 A1* | 3/2014 | Rabeony | B60N 2/2821 | 297/256.16 |
| 2014/0265472 A1* | 9/2014 | Love | B60N 2/2887 | 297/216.11 |
| 2014/0284977 A1* | 9/2014 | Williams | B60N 2/2821 | 297/250.1 |
| 2015/0183341 A1* | 7/2015 | Carpenter | B60N 2/2821 | 297/256.16 |
| 2015/0336481 A1* | 11/2015 | Horsfall | B60R 22/10 | 297/256.16 X |
| 2016/0121764 A1* | 5/2016 | Clement | B60N 2/2884 | 297/216.11 |
| 2016/0332542 A1* | 11/2016 | Cohen | B60N 2/2887 | |
| 2018/0154803 A1* | 6/2018 | Saint | B60N 2/2839 | |
| 2019/0084448 A1* | 3/2019 | Hoover | B60N 2/2809 | |
| 2019/0135141 A1* | 5/2019 | Bennett | B60N 2/2839 | |
| 2019/0308584 A1* | 10/2019 | Eaton | B60R 22/105 | |

FOREIGN PATENT DOCUMENTS

| | | |
|---|---|---|
| EP | 0751033 A2 | 1/1997 |
| EP | 0822115 A2 | 2/1998 |
| FR | 2741847 A1 | 6/1997 |

* cited by examiner

CHILD SAFETY SEAT WITH ANTI-ROTATION DEVICE

This application claims priority to European application number 18151046.2 filed Jan. 10, 2018, the entire contents of which are hereby incorporated by reference in its entirety.

The invention relates to a seat base for a child safety seat comprising an anti-rotation device and to a child safety seat comprising an anti-rotation device. In particular, the anti-rotation device is configured to significantly reduce the forward rotation of the child safety seat in the event of a vehicle accident.

Children, until they have reached a certain age or height, may not be secured in vehicles with the seat belts of the vehicle. Because of this, child safety seats must be used for safely transporting children in a vehicle. Smaller children, such as babies or toddlers, are held firmly in their safety seat mounted on a passenger seat of a vehicle with a special child restraint system, such as an integral harness system. For this age group, a safety seat with a 3-point or 5-point harness using a harness buckle as a coupling device is the safest way to travel. The 3-point or 5-point harness of the safety seat firmly secures shoulders and hips of the child in the seat.

Typically, child safety seats are mounted on a seat of the vehicle. The child safety seats are either secured by using the vehicle's seat belt so—called belted child safety seats—, or by anchoring the child safety seat on the vehicle seat by using a particular anchoring mechanism, such as an Isofix system.

When using anchoring mechanisms, such as Isofix, the child safety seat is attached by means of rigid links or latches to respective anchorage units of the vehicle seats, such as loop mountings fixed in the vehicle. These anchoring mechanisms generally employ two anchorage units. The anchorage units, thus, define a lateral axis of the vehicle. When using the vehicles's seat belt, specifically a lap belt portion of the seat belt, to secure the child safety seat in the vehicle, said lap belt portion similarly defines a lateral axis of the vehicle. As a consequence, in either case, the child safety seat tends to rotate about said lateral axis.

The rotation of the child safety seat about the above-mentioned lateral axis might provide a severe danger and risk of injuries for the child being secured in the child safety seat in the event of both a frontal collision or a rear-end collision. For instance, a rear-end collision may cause the child safety seat to first rise from the vehicle seat and then to bounce back to its original position. The larger the force or energy of the impact is, the higher the child safety seat rotates about the lateral axis, and the higher the fall back is. As a consequence, the child is affected by high accelerations both in the rise from as well as in the fall back to the vehicle seat. In the case of a frontal collision, the child safety seat is also forced to rotate about the lateral axis, thereby being pressed downwards in the vehicle seat. With a forward facing child safety seat, the child sitting in the child safety seat, thus, experiences two rotations: the first is the rotation of the child secured in the child safety seat caused by the rotation of the child safety seat itself; the second is the tilting of the child's body relative to the child safety seat. Because of this, the child may be rotated forward to such an extent that he/she, specifically his/her head, hits the back of a front vehicle seat.

In order to avoid unwanted rotation about the lateral axis when the child safety seat is secured to the vehicle by means of, e.g., the seat belt of the vehicle or Isofix anchorage units, the child safety seat is additionally secured with a so-called anti-rotation device. In order to fulfil legislation, such an anti-rotation device is set as a standard requirement. According to UN ECE regulation 129 "i-Size", phase 3, an anti-rotation device is no more obligatory in connection with belted child safety seats. However, the requirements in terms of rotation of the belted child safety seat stay the same also with UN ECE regulation 129.

According to UN ECE regulation 129 it is mandatory to install child safety seats in rearward-facing direction until the child's age of 15 months. Because of this, the suppression of rotation of child safety seats when installed in rearward-facing direction in the vehicle becomes more and more important.

Different mechanisms for realizing such an anti-rotation device exist. One such mechanism is the so-called top tether. This mechanism comprises a tether and a rigid point in the vehicle body. The tether connects the rigid point to the top of the child safety seat, thereby preventing forward movement of the child safety seat relative to the vehicle seat in the case of a collision.

Another mechanism for suppressing the rotation of the child safety seat about the lateral axis is given by a support leg (also called load leg). A support leg for a child safety seat is a means to prevent the rotation of the child safety seat about the lateral axis in case of an impact. Typically, the support leg is attached to the front end of a seat base for a child safety seat. The support leg supports the seat base against being pressed downward into the vehicle seat in the case of a frontal accident.

EP 0 822 115 A2 relates to a child safety seat for use in a vehicle, comprising a base member adapted to rest on a vehicle seat, a seat assembly mounted on the base member, and first and second guide means on the child seat defining a strap path for a strap of a vehicle seat belt to secure the child seat to a vehicle seat. EP 0 822 115 A2 aims at reducing unwanted movement of the child safety seat in the case of an accident.

The securing of the child safety seat described in EP 0 822 115 A2 might sometimes be cumbersome because for installation the safety belt of the vehicle needs to be guided along the particular strap path. Further, given the long strap path of the system described in EP 0 822 115 A2 there still exists play for the child safety seat to rotate in the case of an impact. Finally, according to EP 0 822 115 A2, for child safety seats used in rearward-facing direction, there is still the need of using a support leg.

It is, thus, an object of the present invention to reduce the rotation of a child safety seat in the case of a vehicle impact by means other than a top tether or a support leg.

This object is achieved by some embodiments of the seat base, and by some embodiments of the child safety seat described herein. Further advantageous embodiments of the present invention are also described herein.

According to a first aspect of the invention there is provided a seat base, for a child safety seat, adapted to be secured with a safety belt of a vehicle. The seat base comprises a base member configured to be placed on a seat of the vehicle, and a positioning element rigidly attached to the base member. The positioning element extends vertically from the base member when the seat base is placed on the seat of the vehicle. The positioning element comprises an engaging member adapted to engage with the safety belt of the vehicle, and the engaging member is coupled to the positioning element above the upper surface of the base member at a distance, and the engaging member is kept by the positioning element at the distance from the base member.

Advantageously, the engaging member is positioned such that the distance is maximal. In other words, the engaging member is positioned at the highest point of the seat base of the invention when the seat base is placed on the seat of the vehicle. In still other words, the engaging member is coupled to the positioning element at the highest point of the seat base.

The distance is preferably defined in relation to a horizontal plane comprising the base member of the seat base. It is important that the engaging member is positioned above the upper surface of the base member. The positioning element has such a structure as to keep the engaging member at the distance from the base member. Since the engaging member has a certain distance from the base member, the engaging member is positioned on the positioning element at an exposed location. At the same time, the engaging member is positioned at a raised point in relation to the base member. Because of this, the distance from the point of exit or outlet of the safety belt of the vehicle to the engaging member the so-called effective belt length is reduced when the child safety seat is installed properly in the vehicle.

In order to further specify this statement, the following reference frame for indicating distances in the vehicle is introduced: said reference frame has a longitudinal axis pointing from the rear end of the car to the front end of the car; a lateral axis perpendicular to the longitudinal axis and lying in a horizontal plane, i.e., pointing from one lateral portion of the vehicle to the other lateral portion; a vertical axis perpendicular to both the longitudinal and the lateral axis; i.e., pointing from the bottom of the vehicle to the top. Henceforth, the longitudinal, lateral, and vertical components of a distance in the vehicle reference frame will be referred to as, respectively, the longitudinal distance, the lateral distance, and the vertical distance.

When the engaging member is positioned at the point of the positioning element having the largest distance from the base member, then the effective belt length is reduced in the sense that the vertical distance between the engaging member and the point of exit or outlet of the safety belt is minimized. The effective belt length can further be reduced by positioning the engaging member on the positioning element such that, in addition, the lateral distance between the engaging member and the point of exit of the safety belt is minimized. While the vertical and the lateral distance between the engaging member and the point of exit of the safety belt are critical for the effectiveness of the invention, it turns out that the longitudinal distance does not have a large impact. This is because the restraining force of the safety belt acts in longitudinal direction. Therefore, substantially only non-vanishing vertical and lateral distances between the engaging member and the point of exit of the safety belt cause slack in the safety belt. As a consequence, if slack is present in the safety belt, a delay occurs in the blocking of the safety belt in the event of an accident. In such a scenario the child safety seat needs to travel/rotate a certain distance in order to compensate for the slack in the safety belt originating in said vertical and lateral distances.

Because of the above, when reference is made in the following to a reduction or optimization of the effective belt length, it is intended that the lateral and/or vertical distances between the engaging member and the point of exit or outlet of the safety belt are minimized.

The engaging member is adapted to engage with the safety belt of the vehicle. In the case of an impact, the force acting on the child safety seat causing the latter to rotate is basically instantaneously transferred to the safety belt of the vehicle. The shorter the effective belt length between the point of exit/outlet of the safety belt and the engaging member, the faster the safety belt blocks, thereby retaining the entire child safety seat. This has also been explained previously. Because of this, the child safety seat is prevented from forward rotation in the case of an impact. The positioning element in combination with the engaging member of the invention provides, thus, for an anti-rotation device. This anti-rotation device takes advantage of the raised position of the engaging member in order to reduce the effective belt length.

The positioning element is preferably formed as an element separate from the base member, and rigidly attached to the base member. It is, however, also possible that the positioning element is integrally formed with the base member; in this case, the positioning element is also rigidly attached to the base member. The positioning element is rigidly attached to the base member. This means that the positioning element is prevented from movement relative to the base member when the seat base is in use. In other words, the movement of the base member causes the positioning element to move in the same direction and vice versa. The rigid attachment of the positioning element to the base member may be accomplished by means that are such as to ensure that relative movement of the positioning element with regard to the base member is prevented when the seat base is used in the vehicle under normal travelling conditions. Because of the rigid attachment of the positioning element to the base member any movement of the base member is transferred to the positioning member and vice versa. Specifically, in this way, the restraining of the positioning element by the safety belt of the vehicle causes a respective restraining of the base member, thus of the entire seat base.

A further advantage of the seat base is that a particularly simple installation of the same using the safety belt of the vehicle without using other anchoring units, such as Isofix, is possible. For this, the seat base preferably comprises additional belt guides adapted to guide a lap belt portion of the safety belt of the vehicle. For belted child safety seats, the diagonal portion of the safety belt of the vehicle is preferably guided through the engaging member, making sure that the safety belt engages with the engaging member, and the lap belt portion is guided through the belt guides of the seat base. Therefore, both the securing of the seat base with the safety belt as well with the anti-rotation device may be accomplished in basically one single step.

The seat base according to the first aspect of the invention is not restricted to the use with belted child safety seats. It is also possible that the seat base additionally comprises a pair of rigid links projecting from the base member, each of the rigid links having a releasable connector, such as Isofix connectors, and being adapted to be engaged with respective anchorage units provided in the vehicle seat.

Advantageously, the engaging member is located such that it lies substantially in a horizontal plane with the point of exit of the safety belt of the vehicle when the seat base is placed on the seat of the vehicle. In this case, the vertical distance between the engaging member and the point of exit of the safety belt is substantially zero. If the point of exit/outlet of the safety belt and the engaging member are substantially comprised by a horizontal plane, the effective belt length, i.e., the distance from the point of exit to the engaging member, is reduced, given the legal and constructional constraints. In other words, an ideal position of the engaging member is reached if the engaging member lies substantially in a horizontal plane with the point of exit of the safety belt provided that the seat base or child safety seat is properly placed and installed in the vehicle. The optimal effective belt length in the sense given above is reached when, in addition to the placement of the engaging element in the horizontal plane through the point of exit, the lateral distance between the engaging member and the point of exit of the safety belt is substantially zero. In this case, the suppression of the rotation of the seat base or child safety seat in the case of an impact is maximized.

It might, however, also be advantageous if the engaging member lies substantially in the horizontal plane and if the engaging member has substantially the same distance from both lateral sides of the base member. By this, the anti-rotation device of the invention has the same effect no matter on which one of the left or right vehicle seat the seat base is placed.

It can be seen from the previous paragraph that the advantages of the present invention become more and more apparent the closer the engaging member is located with regard to a horizontal plane going through the point of exit of the safety belt of the vehicle, when the seat base or the child safety seat is properly installed on the seat of the vehicle.

Preferably, the positioning element comprises a rebound bar. The rebound bar is configured to prevent the seat base from bouncing back, that is, from upward rotation from the vehicle seat, in the case of a frontal impact. The rebound bar is further configured to prevent the seat base from rotation in the case of a rear impact of the vehicle. The rebound bar is an equipment for a child safety seat which is advantageously attached to the base member or a child safety seat such as to be adjacent to the backrest portion of a vehicle seat when the seat base or child safety seat is properly installed in the vehicle. The rebound bar advantageously extends vertically from the base member of the seat base. The rebound bar prevents rotation of the seat base or child safety seat upwardly in the case of a rear impact. In the event of a rear impact, the force of inertia tries to rotate the seat base or child safety seat in a direction upward with regard to the surface of the vehicle seat. With the aid of the rebound bar, this rotation is suppressed, because the rebound bar extending upwardly from the base member of the seat base or the child safety seat is pressed against the backrest portion of the vehicle seat. By this, the vertical extension of the seat base or child safety seat at the backrest portion of the vehicle seat is increased, thereby restricting the rotation about an axis parallel to the backrest portion of the vehicle seat.

The usage of a rebound bar is particularly advantageous for child safety seats used in rearward-facing direction.

If the positioning element comprises the rebound bar the advantage is that structures that might already be present on seat bases or child safety seats may be used. Many of the child safety seats with a seat base have a rebound bar. Because of this, the implementation of the anti-rotation device in accordance with the invention is particularly easy to accomplish. Preferably, the engaging member is coupled to the rebound bar. It is, however, also possible that an additional structure is combined with the rebound bar providing the positioning element in accordance with the invention.

Preferably, the engaging member comprises a belt guide configured to guide the safety belt of the vehicle from the point of exit of the safety belt through the engaging member to a buckle of the safety belt. The belt guide ensures that the safety belt of the vehicle is properly guided through the anti-rotation device. The belt guide keeps the safety belt in place such that the effective belt length remains optimal or reduced. With this, the proper functioning of the anti-rotation device of the invention is guaranteed even and especially during an impact. Furthermore, a belt guide is easy to handle by a user.

It is also advantageous if the engaging member comprises a locking mechanism configured to releasably lock the safety belt of the vehicle such as to substantially suppress slippage of the safety belt through the engaging member in the case of a vehicle accident. Using an engaging member with a locking mechanism has the advantage that the safety belt of the vehicle may already be installed with a certain amount of pre-tension. In addition, the locking-mechanism ensures that the effective belt length does not substantially increase in the case of an accident. The locking mechanism suppresses slippage of the safety belt through the engaging member. Because of this, it is ensured that the safety belt of the vehicle blocks as fast as possible in the case of an impact. In this case, the rotation of the seat base or of the child safety seat is further suppressed.

In order to allow removal of the seat base or child safety seat from the vehicle it is necessary that the locking mechanism allows for disengaging the safety belt.

Preferably, the locking mechanism comprises a tensioning mechanism for pre-tensioning the safety belt of the vehicle. The tensioning mechanism may be used to further increase the tension of the safety belt of the vehicle, e.g., already upon installation of the seat base or child safety seat in the vehicle. With this, the retention of the safety belt may be further optimized. In other words, the slack from the point of exit of the safety seat of the vehicle to the engaging member of the seat base or child safety seat is minimized. The higher the pre-tension in the safety belt of the vehicle, the less the forward rotation of the seat base or child safety seat in the case of an impact is. Forward movement of the seat base or child safety seat is reduced, again.

It is also advantageous if the locking mechanism comprises a clamp adapted to clamp the safety belt of the vehicle so as to substantially suppress slippage of the safety belt through the engaging member in the case of a vehicle accident. Using a clamp provides one possible way in accordance with the invention to structurally implement the locking mechanism.

It is preferable if the locking mechanism comprises a ratchet mechanism. A ratchet mechanism provides one way to implement a releasable locking mechanism and/or a tensioning mechanism in accordance with the invention.

Advantageously, the positioning element has an adjustable length. Preferably, the position of the engaging member is adjustable. A length-adjustable positioning element has the advantage that the length may be adjusted depending on different geometries of different vehicles. That is, a length-adjustable positioning element allows for choosing the length such that the engaging member is ideally positioned, i.e., the effective belt length from the point of exit/outlet of the safety belt to the engaging member may be reduced. Preferably, the length of the positioning element may be adjusted such that the engaging member lies substantially in a horizontal plane through the point of exit/outlet of the safety belt when the seat base or child safety seat is properly installed in the vehicle. The position of the engaging member may be adjustable by adjusting the length of the positioning element. By this, the position of the engaging member is indirectly adjustable. It is, however, also possible that the engaging member is adjustable relative to, e.g., along, the positioning element. By this, the effective belt length may further be reduced. Such an adjustment of the engaging member relative to the positioning element allows for minimizing the lateral distance between the engaging member and the point of exit of the safety belt according to the placement of the seat base or child safety seat in the vehicle. A length adjustable positioning element and an engaging member adjustable relative to the positioning element allows to adjust an optimal effective belt length no matter where the seat base or the child safety seat is placed in the vehicle.

Advantageously, the safety belt of the vehicle is a diagonal belt of a three-point safety belt. The diagonal belt allows to engage with the engaging member of the anti-rotation device of the invention at a point which is distant from and raised with regard to the base member of the seat base. Because of this, the diagonal belt is best suited for preventing the seat base or child safety seat from rotating in the case of a vehicle impact.

According to a second aspect of the invention there is provided a child safety seat adapted to be secured with a safety belt of a vehicle. The child safety seat comprises a seat shell for receiving a child, and a seat base according to the first aspect of the invention.

It is understood that the child safety seat of the second aspect of the present invention may be used with any one of the advantageous and preferable embodiments of the seat base described above in relation to the first aspect of the invention. The advantages are the same as described above.

Advantageously, the positioning element is configured to be positioned adjacent to a backrest portion of the vehicle seat when the child safety seat is used in rearward-facing position in the vehicle. When the positioning element is placed adjacent, that is, right next to the backrest portion of the vehicle, it is possible that the effective belt length is reduced. In particular when the child safety seat is placed in rearward-facing direction in the vehicle, it is important that the distance from the point of exit/outlet of the safety belt of the vehicle to the engaging member coupled to the positioning element is kept as small as possible. By doing this, forward movement or rotation of the child safety seat is reduced. In other words, the smaller the effective belt length is, the faster the safety belt of the vehicle blocks in the case of an impact. Thereby, the child safety seat is prevented from significantly rotating.

It is preferable if the change from the child safety seat being placed in rearward-facing direction to forward-placing direction may be accomplished by rotating the seat shell of the child safety seat without rotating the seat base of the child safety seat. This has the advantage that the positioning element with the engaging member does not change, either. The anti-rotation device of the present invention works, thus, equally in the rearward-facing and in the forward-facing direction of the child safety seat.

Advantageously, the engaging member is positioned at the point of the child safety seat which has the smallest lateral and vertical distance from the point of exit of the safety belt of the vehicle when the child safety seat is in use and placed on the seat of the vehicle. In this case, as described above, the effective belt length is optimal in the sense of the invention. The rotation of the child safety seat in the case of an impact is suppressed. Further advantages have been described above in relation to the impact of the effective belt length on the forward movement or rotation of the seat base and the child safety seat of the invention.

Specific embodiments of the invention will now be described by way of example and with reference to the accompanying drawings, in which.

Figure 3A:
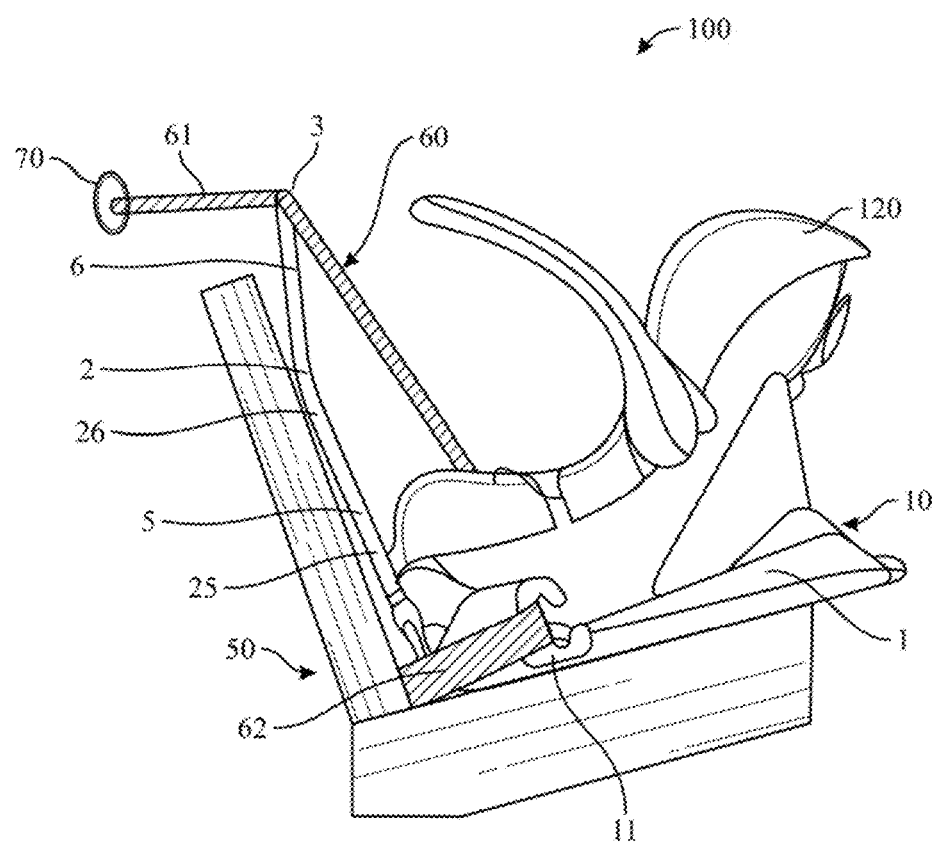
Figure 3B:
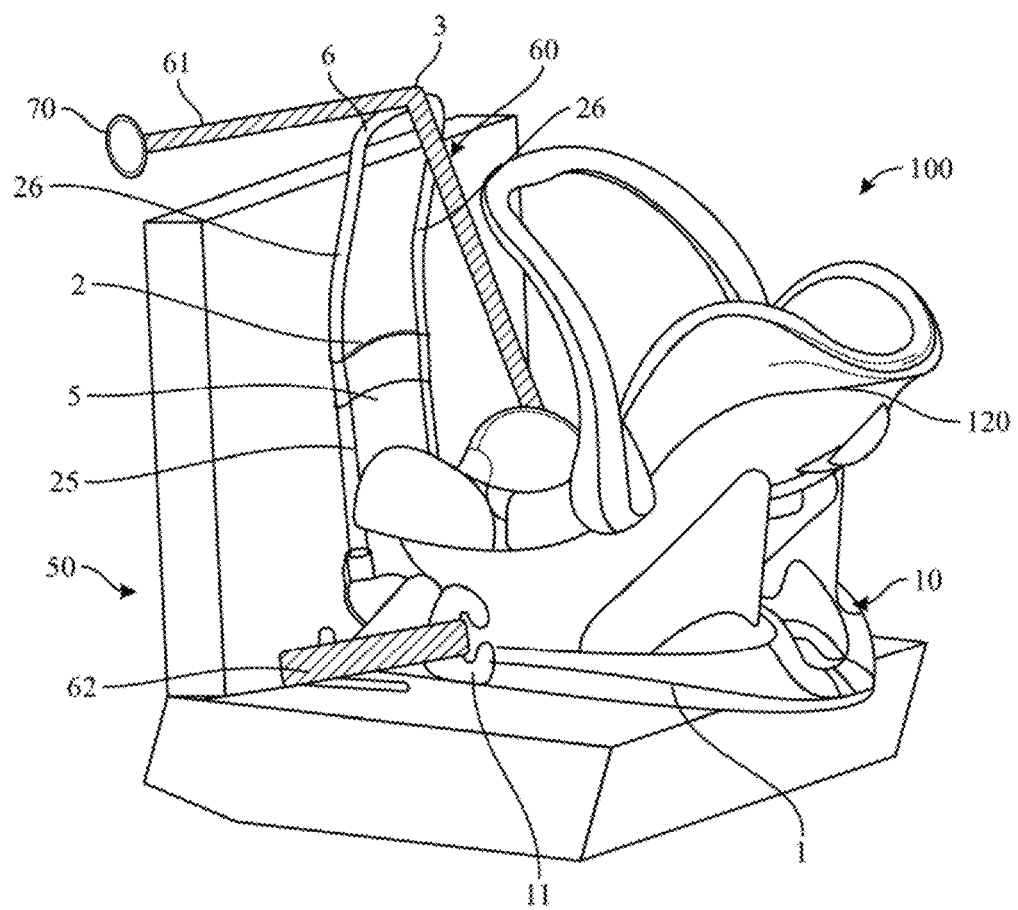
Figure 4A:
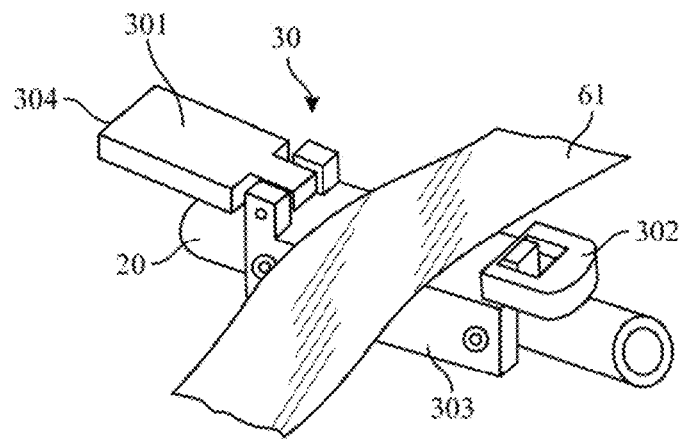
Figure 4B:
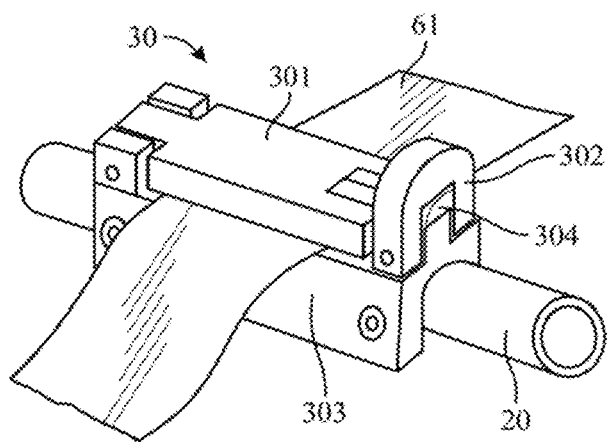
Figure 5A:
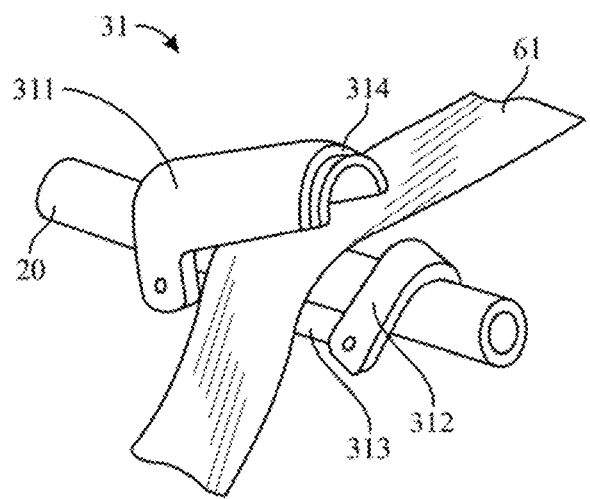
Figure 5B:
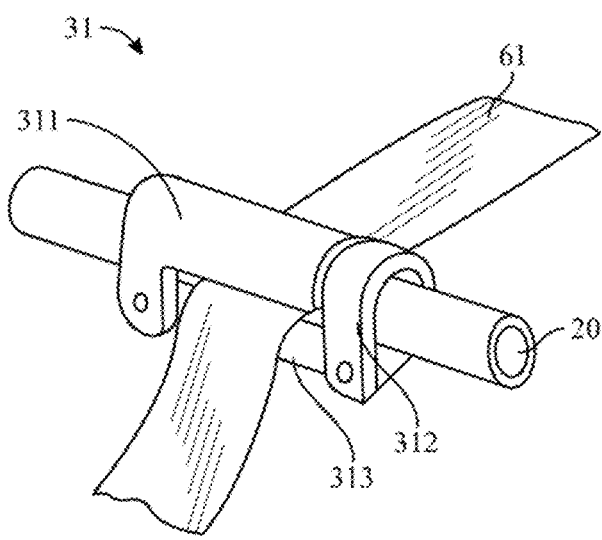

FIG. 3*a* shows a side view of a child safety seat in accordance with the invention comprising a seat base with an anti-rotation device;

FIG. 3*b* shows a perspective view of the child safety seat of FIG. 3*a*;

FIG. 4*a* shows one embodiment of the engaging member of the anti-rotation device according to the invention in an open configuration;

FIG. 4*b* shows the engaging member of FIG. 4*a* in the locked configuration;

FIG. 5*a* shows a second embodiment of the engaging member of the anti-rotation device according to the invention in an open configuration;

FIG. 5*b* shows the engaging member of FIG. 5*a* in a locked configuration.

Figure 1:
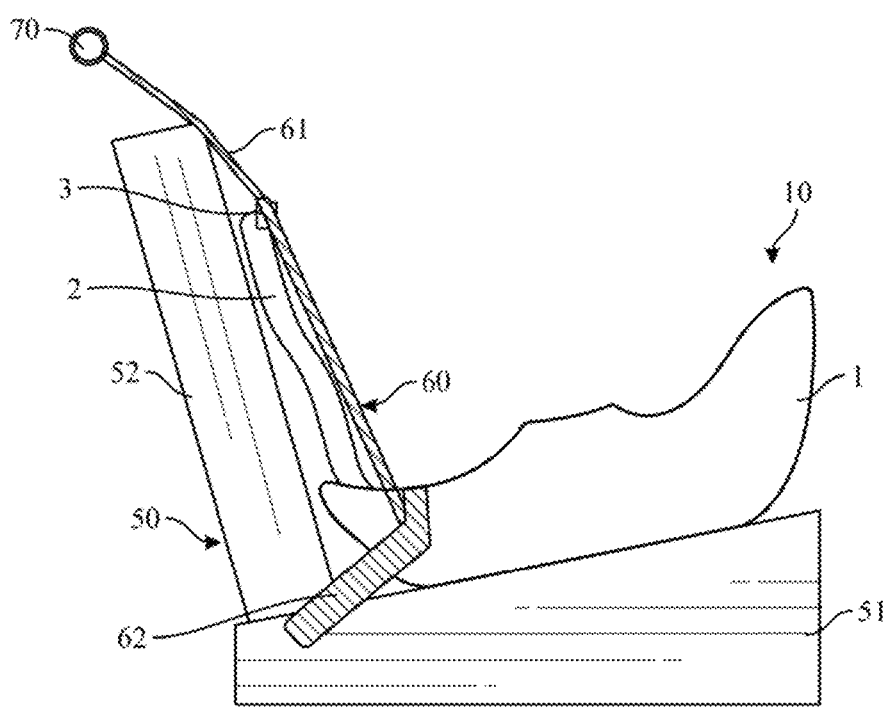
FIG. 1 shows a side view of a seat base in accordance with the invention comprising an anti-rotation device.

FIG. 1 shows a seat base 10 in accordance with the invention. The seat base 10 comprises a base member 1 and a positioning element 2. The seat base 10 is placed on a seat 50 of a vehicle. For this, the base member 1 of the seat base 10 is positioned on the seating portion 51 of the seat 50. The positioning element 2 is rigidly attached to the base member 1 and extends vertically from the base member. The seat base 10 is positioned such on the seat 50 that the positioning element 2 is adjacent to the backrest portion 52 of the seat 50. An engaging member 3 is attached to the positioning element 2 at a certain distance from the base member 1. The engaging member 2 engages with the safety belt 60 of the vehicle. In FIG. 1 the engaging member 2 engages with the diagonal belt 61 of a three-point safety belt 60. FIG. 1 only schematically sketches the engaging member 2. Many different embodiments for the engaging member 2 are possible and they will be described further below.

The seat base 10 is secured to the vehicle seat 50 by means of the lap belt 62 of the three-point safety belt 60 and the diagonal belt 61 engaging with the engaging member 3. The lap belt 62 is guided over the upper surface of the base member 1. The seat base 10 or, preferably, the base member 1 may comprise belt guides for guiding the lap belt 62 along the seat base 10 or base member 1 and to keep the lap portion 62 in place.

As can be seen from FIG. 1, at least a part of the positioning element 2 substantially is in contact with the backrest portion 52. Preferably, the positioning element 2 is a rebound bar. The rebound bar may be part of the anti-rotation device of the seat base 50 or of a child safety seat. The rebound bar is designed such as to enlarge the vertical extension of the seat base 50 at the backrest portion 52 of the vehicle seat 50 when the seat base 10 is placed on the vehicle seat 50. The rebound bar is, thus, designed such as to avoid rotation of the seat base 50 or of a child safety seat in the case of a rear impact. If the vehicle is exposed to a rear impact, then the force of inertia aims at rotating the seat base 10 upwardly from the seating portion 51. When a rebound bar is used, such an upward rotation is suppressed, because of the enlarged vertical extension of the seat base 10 at the backrest portion 52 of the seat 50. The use of a rebound bar is, in particular, important when a child safety seat is used in rearward-facing position in the vehicle. In this case, the child is positioned in the child safety seat in direction opposite to the normal driving direction. The child's head is, thus, further distant from the backrest portion 51 of the vehicle seat 50 than his or her feet.

The positioning element 2 is constructed from a material with a certain stability and/or rigidity. This is particularly required if the positioning element 2 serves as a rebound bar. In this case, the positioning element 2 needs to be stable enough for resisting the depression of the rebound bar into the backrest portion 52 of the seat 50 in the event of upward rotation of the seat base 10 caused by a rear impact. In addition, a certain degree of stability and/or rigidity is necessary in order to keep the engaging member 3 at a certain distance from the base member 3.

In FIG. 1 it is shown that the diagonal belt 61 of the safety belt 60 exits the point of exit 70 of the safety belt 60 in the vehicle, and is guided through the engaging member 3 of the seat base 10. The engaging member 3 has a certain distance from the upper surface of the base member 1. As shown in FIG. 1, the engaging member 3 is positioned close to the largest distance from the upper surface of the base member 1 of the seat base 10. Since the diagonal belt 61 engages with the engaging member 3 close to the highest point of the seat base 10, the vertical distance from the point of exit 70 of the safety belt 60 to the engaging member 3, i.e., the first contact point of the diagonal belt 61 with the seat base 10, is minimized. The distance from the point of exit 70 to the engaging member 3 is the so-called effective belt length. The positioning element 2 with the engaging member 3 coupled or attached to the positioning element provides for an anti-rotation device of the seat base 10. This is because in the case of an accident, owing to the engagement of the diagonal belt 61 with the engaging member 3, the acceleration of the seat base 10 causes the diagonal belt 61 to be accelerated out of the point of exit 70, as well. Once said acceleration reaches a certain threshold, the diagonal belt 61 blocks from moving. By this, the diagonal belt 61 restrains the engaging member 3 and, thus, the positioning element 2 together with the base member 1, owing to the rigid attachment of the positioning element 2 to the seat base 1, from further movement, too. Because of this, rotation of the seat base 10 is suppressed in the event of an accident.

Moreover, the more reduced the effective belt length is, the more effective the suppression of the rotation in the event of an accident becomes. As mentioned further above, by reducing the effective belt length it is intended that the lateral and/or vertical distances between the engaging member 3 and the point of exit 70 of the safety belt 60 are minimized. This is because for a small effective belt length the acceleration of the seat base 10 is more effectively transferred to the diagonal belt 61 of the seat belt 60. Furthermore, the smaller the effective belt length is, the easier it is possible to avoid slack in the portion of the diagonal belt 61 extending from the point of exit 70 to the engaging member 3.

From what has been said before, the position of the engaging member 3 shown in FIG. 1 is not the optimal position; the engaging member could further be raised in order to minimize the vertical distance between the engaging member 3 and the point of exit 70, and to thereby reduce the effective belt length. However, the seat base 10 in accordance with the invention shown in FIG. 1 has the particular advantage that a conventional seat base with rebound bar can be used and be equipped with an engaging member 3 without further modifications. Instead of raising the engaging member 3, the engaging member may comprise a tensioning device for pre-tensioning the diagonal belt 61. Such a tensioning device may, thus, compensate for the non-optimal position of the engaging member 3. The use of tensioning devices will be described further below.

Figure 2:
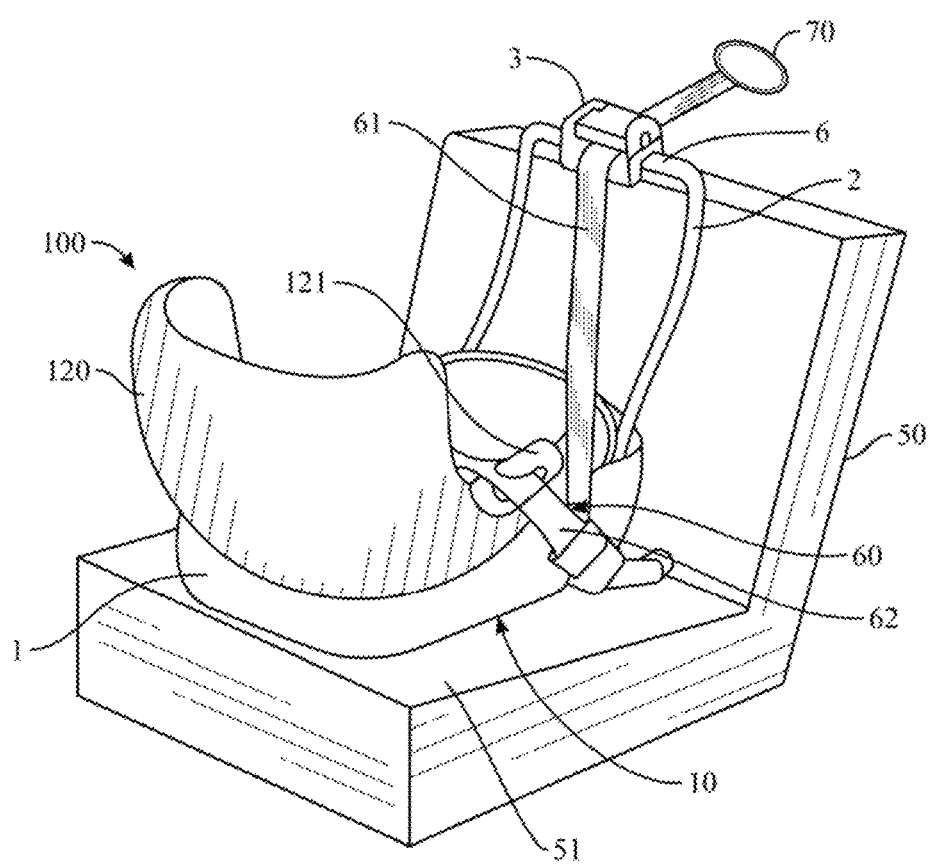
FIG. 2 shows a perspective view of a child safety seat with an anti-rotation device in accordance with the invention, the child safety seat being placed in rearward-facing direction.

FIG. 2 shows a child safety seat 100 according to the invention. The child safety seat 100 comprises a seat base 10 and a seat shell 120 for receiving a child. The seat base 10 comprises a base member 1 and a positioning element 2. An engaging element 3 is attached or coupled to the positioning element 2. The child safety seat 100 is placed on the seat 50 of a vehicle. For this, the base member 1 of the seat base is placed on the seating portion 51 of the seat 50. The child safety seat 100 is placed in rearward-facing direction on the seat 50. The seat shell 120 is coupled to the seat base 10. The seat shell 120 can either be integrally or separately formed with the seat base 10. The seat base 10 shown in FIG. 2 differs from the seat base 10 shown in FIG. 1 in that in FIG. 2 the engaging member 3 is shown in an ideal position, given the constructional constraints. That is, the effective belt length, i.e., the vertical distance from the point of exit 70 to the engaging member 3 is chosen as small as possible, given the constructional constraints imposed by the geometry of the child safety seat. This means, that the point of exit 70 and the engaging member 3 are comprised substantially by a horizontal plane. In other words, the point of exit 70 and the engaging member 3 are positioned substantially at the same height from the seating portion 51 of the vehicle seat 50, or the floor of the vehicle, or any other suitable point of reference.

The engaging member 3 of the child safety seat 100 shown in FIG. 2 is placed in the central region of the top part 6 of the positioning element 2. This position of the engaging member 3 is preferable because it allows to install the child safety seat on either one of the left or right vehicle seat with the same effectiveness of the anti-rotation device. The lateral distance between the engaging member 3 and the point of exit 70 in this case is, however, not minimal.

The portion of the diagonal belt 61 of the safety belt 60 from the point of exit 70 to the engaging member 3, thus, is guided substantially horizontally. The portion of the diagonal belt 61 continuing after the engaging member 3 then runs essentially vertically toward the base member 1 of the seat base.

The closer the engaging member 3 approaches the horizontal plane going through the point of exit 70 of the safety belt, the more reduced the effective belt length gets. As a consequence, the more effective is the suppression of rotation of the seat base 10 or the child safety seat 100. By means of the anti-rotation device formed by the positioning element 2 with engaging member 3, the seat base 10 or the child safety seat 100 is protected against significant depression into the seating portion 51 of the vehicle seat 50, and thus, against rotation downward into the seating portion 51.

The seat base 10 shown in FIG. 2 differs from the seat base shown in FIG. 1 in the height/vertical extension of the positioning element 2. Except for this, as far as the seat base 10 is concerned, reference can be made to the seat base 10 described in view of FIG. 1.

The child safety seat 100 of FIG. 2 is secured with the lap portion 62 of the safety belt 60 and the diagonal belt 61 engaged in the engaging member 3. The lap portion 62 is guided through belt guides 121 of the seat shell 120. These allow for keeping the lap portion 62 in position and in place when the child safety seat 100 is secured with the safety belt 60 on the seat 50 of the vehicle. By this, it is avoided that the safety belt is misplaced or loosened during travelling in the vehicle.

In FIGS. 3a and 3b there is shown another embodiment of a child safety seat 100 in accordance with the present invention. FIG. 3a shows the child safety seat 100 from the side. FIG. 3b is a perspective view of the child safety seat 100. The child safety seat 100 shown in FIGS. 3a and 3b comprises a seat shell 120 and a seat base 10. The shown seat shell 120 is part of a so-called infant carrier. Infant carriers are typically used for transporting children with ages up to 15 months. The child safety seat 100 is installed in rearward-facing direction. For this, the child safety seat 100 is placed on the seat 50 of a vehicle such that the head of a child when lying in the seat shell 120 is closer to the front part of the vehicle than his or her feet.

The seat shell 120/the infant carrier is coupled to the seat base 10. Preferably, the seat shell 120/infant carrier is releasably locked to the seat base 10. This allows for a permanent installation of the seat base 10 in the vehicle, while the seat shell 120/infant carrier may be easily removed. Therefore, the child may be taken out of the vehicle in the seat shell 120/infant carrier.

The seat base 10 comprises a base member 1 and a positioning element 2. The positioning element 2 is rigidly attached to the base member 1. An engaging member 3 for engaging with the safety belt 60 of a vehicle is coupled to the positioning element 2. The positioning element 2 and the engaging member 3 form part of the anti-rotation device in accordance with the invention. In the embodiment shown in FIGS. 3a and 3b, the engaging member 3 is attached to the positioning element 2 at a point which has the largest distance from the upper surface of the base member 1. In other words, when the child safety seat 100 or the seat base 10 is properly installed on the seat 50 of the vehicle, then the engaging member 3 is substantially the highest point of the child safety seat. It can be further seen that the portion of the diagonal belt 61 of the safety belt 60 running from the point of exit 70 of the safety belt to the engaging member 3 is substantially horizontal. Because of this, as mentioned before in relation to the other embodiments of the invention, the effective belt length is reduced. The advantages of a reduced effective belt length are the same as those described in detail in relation to the other embodiments of the invention discussed previously, and which is reference made to.

The diagonal belt 61 engages with the engaging member 3. Specific embodiments of the engaging member 3 will be described further below, e.g., in view of FIGS. 4a, 4b, 5a, 5b, and thereafter. The engaging member 3 is configured such as to guide the diagonal belt 61 and/or to restrain the diagonal belt 61 from loosely moving over the positioning element 1. The engagement between the diagonal belt 61 and engaging member 3 is such that in the event of an accident the engaging member 3 is capable of transferring the acceleration or force of inertia exerted on the seat base 10 or child safety seat 100 onto the diagonal belt 61. Furthermore, the engaging member 3 is configured such that there is sufficient interaction with the diagonal belt 61, e.g., by means of friction, mechanical force, etc., for avoiding substantial slippage of the diagonal belt 61 through the engaging member 3. This configuration ensures that the diagonal belt 61 quickly blocks in the case of an accident, and that the blocking diagonal belt 61 restrains the child safety seat 100 or seat base 10 from rotating into the vehicle seat 50. Such a forward rotation may arise, in particular, in the event of a frontal collision.

The positioning element 2 extends vertically from the base member 1. The positioning element 2 shown in FIGS. 3a and 3b is a rack or frame. As it is particularly manifest from FIG. 3b, the positioning element 2 comprises a rebound bar 5 and an additional top part or top frame 6. The top part or top frame 6 extends further vertically from the rebound bar 5. By means of the top part of top frame 6 it is possible to raise the engaging member 3 which is attached to the positioning element 2. As particularly shown in FIG. 3a, the top part or top frame 6 of the positioning element 2 ensures that the engaging member 3 lies substantially in a horizontal plane with the point of exit 70 of the safety belt. The rebound bar 5 and the top part or top frame 6 of the positioning element 2 may be integrally or separately formed. It may be also of advantage if the length of the positioning element 2 is adjustable. By using the structural design employing a rebound bar 5 and an additional top part or top frame 6 this may be easily accomplished. For instance, the bars 26 of the top part or top frame 6 may be slidable along the bars 25 of the rebound bar 5. A locking mechanism may be used to lock the top part or top frame 6 at the desired height. The height adjustment of the positioning element 2 is advantageous for placing the engaging member 3 such that it lies in a substantially horizontal plane going through the point of exit 70 of the safety belt of the vehicle. Furthermore, height adjustment is advantageous for reducing the dimensions of the child safety seat during transport or stowing away.

From FIG. 3b it is manifest that the engaging member 3 is centrally placed on the top part or top frame 6. This means, that the engaging member 3 is substantially the same lateral distance from both lateral sides of the base member 1 of the child safety seat 100. It might, however, also be advantageous if the engaging member 3 is adjustable along the top part or top frame 6. This allows to minimize the lateral distance between the engaging member 3 and the point of exit 70. The effective belt length may, thus, be adjusted so as to be optimal no matter on which of the left or right vehicle seat the child safety seat 100 is installed.

The rebound bar 5 of the positioning element 2 provides for protection against upward rotation. Upward rotation, i.e., rotation of the seat base 10 or the child safety seat 100 up from the seating portion of the vehicle seat 50, occurs particularly in the event of a rear impact. As mentioned before in relation to the other embodiments of the invention, the rebound bar increases the vertical extension and vertical area of the part of the seat base or child safety seat being adjacent to the backrest portion of the vehicle seat. Because of this, upward rotation is suppressed.

The base member 1 of the seat base 10 further comprises belt guides 11. The belt guides 11 of the seat base 10 are adapted to receive the lap belt 62 of the safety belt of the vehicle. The lap belt 62 is guided through the base member 1 from one of the belt guides 11 to the other. The belt guides 11 make sure that the lap belt 62 is securely kept in place when the seat base 10 is installed in the vehicle. The seat shell 120 coupled to the base member 1 of the seat base 10 additionally prevents that the lap belt 62 gets loosened or removed from the seat base 10.

The child safety seat 100 comprising a seat shell 120 and a seat base 10 as shown in FIGS. 3a and 3b is also known under the general term child restraint system (CRS).

In the following there are presented exemplary engaging members in accordance with the invention.

FIGS. 4a and 4b show a first lock-off 30. The first lock-off 30 is coupled to the positioning element (FIGS. 4a and 4b only sketch a portion 20 of the positioning element). The first lock-off 30 can be used as an engaging member in accordance with the invention. In FIG. 4a the first lock-off 30 is in an open configuration. In this case, one pivotable part 301 of the first lock-off 30 is in a position such that the safety belt, preferably the diagonal belt 61, of the vehicle can be inserted into the first lock-off 30. Furthermore, it is shown that a locking member 302 is also in an unlocked position. The locking member 302 is configured to lock the pivotable part 301 in the locked position.

FIG. 4b shows the first lock-off 30 in the locked position. In this case the locking member 302 locks the pivotable part 301. For this, the locking member 302 engages with a corresponding engaging part 304 (also shown in FIG. 4a) of the first lock-off 30. Pivotable part 301 and locking member 302 are part of a locking mechanism. In addition, the pivotable part 301 engages with the diagonal belt 61. The pivotable part 301 clamps the diagonal belt 61 against the supporting part 303 of the first lock-off. The engagement between the diagonal belt 61 and the first lock-off 30 is such that in the event of an accident the lock-off transfers the acceleration or force of inertia exerted on the seat base onto the diagonal belt 61. Furthermore, owing to the clamping of the diagonal belt in the first lock-off 30, the mechanical force and friction provide sufficient interaction with the diagonal belt 61, such that substantial slippage of the diagonal belt 61 through the first lock-off 30 is avoided.

Owing to the structural design of the first lock-off 30 shown in FIGS. 4a and 4b, the first lock-off 30 may also be referred to as a belt clamp.

FIGS. 5a and 5b show an alternative embodiment of the engaging member in accordance with the invention. FIGS. 5a and 5b show a second lock-off. The second lock-off 31 of FIGS. 5a and 5b comprises a respective pivotable part 311, a locking member 312, and a supporting part 313. The second lock-off 31 is coupled to the positioning element (as before, only a part 20 of the positioning element is sketched for representational purpose).

In FIG. 5a, the second lock-off 31 is in its unlocked configuration. In this case, the safety belt, preferably the diagonal belt 61, of a vehicle may be inserted in the second lock-off 31.

FIG. 5b shows the second lock-off 31 in the locked configuration with the diagonal belt 61 inserted and engaging with the second lock-off 31. In this case, the locking member 312 engages with a respective engaging part 314 (visible in FIG. 5a) of the pivotable part 311. Pivotable part 311 and locking member 312 are part of a locking mechanism. In comparison to the lock-off described in view of FIGS. 4a and 4b, with regard to the second lock-off 31 of FIGS. 5a and 5b the diagonal belt 61 is clamped between the pivotable part 311 of the second lock-off 31 and a respective portion of the positioning element. The part of the pivotable part 311 engaging with the diagonal belt 61 has a shape which fits to the surface of the respective portion of the positioning element. Because of this, it is guaranteed that the engagement of the diagonal belt 61 between the pivotable part 311 and the respective portion of the positioning element is strong. As shown in FIG. 5b, the diagonal belt 61 is guided around the portion of the positioning element. Therefore, the length of the diagonal belt 61 engaging with the second lock-off 31 is increased. This causes a tighter engagement. Owing to the winding of the diagonal belt 61 around the positioning element, the frictional forces are also increased. This further suppresses slippage of the diagonal belt 61 through the second lock-off 31.

Given the structural design of the second lock-off 31 shown in FIGS. 5a and 5b, the second lock-off 31 may also be referred to as a belt clamp.

In addition to the engaging members shown in FIGS. 4a, 4b, 5a, and 5b, i.e., first lock-off 30 and second lock-off 31, respectively, further embodiments of the engaging member are possible.

For instance, several variants of the lock-off may be used. One of such variant may comprise a tensioning device for pre-tensioning or re-tensioning the safety belt engaged in the engaging member/lock-off. Such a tensioning device is particularly useful for reducing slack in the diagonal belt. The tensioning device may comprise a ratchet mechanism. A ratchet mechanism allows to tighten the diagonal belt, but at the same time the ratchet mechanism ensures that the diagonal belt is not loosened. In order to release the diagonal belt from engagement with the engaging member, the ratchet mechanism needs to be released, e.g., by pushing a respective button or by operating a lever. Finally, a simple belt guide adapted to receive and guide the diagonal belt may also be used as an engaging member in accordance with the invention. A belt guide is suitable as an engaging member in accordance with the invention as long as the engagement between the diagonal belt and the belt guide is such that in the event of an accident the belt guide transfers the acceleration or force of inertia exerted on the seat base onto the diagonal belt and that there is provided sufficient interaction with the diagonal belt, such that substantial slippage of the diagonal belt through the belt guide is avoided.

LIST OF REFERENCE NUMERALS 10 seat base
1 base member
2 positioning element
3 engaging member
5 rebound bar of the positioning element 2
6 top part or top frame of the positioning element 2
25 bars of the rebound bar 5
26 bars of the top part of top frame 6
11 belt guides of the seat base 10
100 child safety seat
120 seat shell
121 belt guides of the seat shell 120
20 portion of the tensioning element 2
30 first lock-off
301 pivotable part of the first lock-off 30
302 locking member of the first lock-off 30
303 supporting part of the first lock-off 30
304 engaging part of the pivotable part 301 of the first lock-off 30
31 second lock-off
311 pivotable part of the second lock-off 31
312 locking member of the second lock-off 31
313 supporting part of the second lock-off 31
314 engaging part of the pivotable part 311 of the second lock-off 31
50 seat of a vehicle
51 seating portion of the seat 50
52 backrest portion of the seat 50
60 safety belt of the vehicle
61 diagonal belt of the safety belt 60
62 lap belt of the safety belt 60
70 point of exit of the safety belt 60

The invention claimed is:

1. A seat base for a child safety seat, adapted to be secured with a safety belt of a vehicle, comprising:
a base member configured to be placed on a seat of the vehicle, and
a positioning element rigidly attached to the base member, the positioning element extending vertically from the base member when the seat base is placed on the seat of the vehicle,
wherein the positioning element comprises an engaging member adapted to engage with the safety belt of the vehicle,
wherein the engaging member is coupled to the positioning element above an upper surface of the base member at a distance, and the engaging member is kept by the positioning element at the distance from the base member, and wherein the engaging member is located such that the engaging member lies substantially in a horizontal plane with a point of exit of the safety belt of the vehicle when the seat base is placed on the seat of the vehicle.

2. The seat base according to claim 1, wherein the engaging member is positioned such that the distance is maximal.

3. The seat base according to claim 1, wherein the positioning element comprises a rebound bar, the rebound bar being configured to prevent the seat base from rotation in a case of a rear impact of the vehicle.

4. The seat base according to claim 1, wherein the engaging member comprises a belt guide configured to guide the safety belt of the vehicle from the point of exit of the safety belt through the engaging member to a buckle of the safety belt.

5. The seat base according to claim 1, wherein the engaging member comprises a locking mechanism configured to releasably lock the safety belt of the vehicle so as to substantially suppress slippage of the safety belt through the engaging member in a case of a vehicle accident.

6. The seat base according to claim 5, wherein the locking mechanism comprises a tensioning mechanism for pre-tensioning the safety belt of the vehicle.

7. The seat base according to claim 5, wherein the locking mechanism comprises a clamp adapted to clamp the safety belt of the vehicle so as to substantially suppress slippage of the safety belt through the engaging member in the case of a vehicle accident.

8. The seat base according to claim 5, wherein the locking mechanism comprises a ratchet mechanism.

9. The seat base according to claim 1, wherein the positioning element has an adjustable length, so that the distance can be varied.

10. The seat base according to claim 1, wherein position of the engaging member is adjustable.

11. The seat base according to claim 1, wherein the safety belt of the vehicle is a diagonal belt of a three-point safety belt.

12. A child safety seat adapted to be secured with a safety belt of a vehicle, comprising:
a seat shell for receiving a child, and
a seat base comprising:
a base member configured to be placed on a seat of the vehicle, and
a positioning element rigidly attached to the base member, the positioning element extending vertically from the base member when the seat base is placed on the seat of the vehicle,
wherein the positioning element comprises an engaging member adapted to engage with the safety belt of the vehicle,
wherein the engaging member is coupled to the positioning element above an upper surface of the base member at a distance, and the engaging member is kept by the positioning element at the distance from the base member, and
wherein the engaging member is located such that the engaging member lies substantially in a horizontal plane with a point of exit of the safety belt of the vehicle when the seat base is placed on the seat of the vehicle.

13. The child safety seat according to claim 12, wherein the positioning element is configured to be positioned adjacent to a backrest portion of the vehicle seat when the child safety seat is used in a rearward-facing position in the vehicle.

14. The child safety seat according to claim 12, wherein the engaging member is positioned at the point of the child safety seat which has asmallest lateral and vertical distance from the point of exit of the safety belt of the vehicle when the child safety seat is in use and placed on the seat of the vehicle.

* * * * *